S. Gibson.

Scrub Brush.

No. 3,773. Reissued Dec. 21, 1869.

Witnesses.
C E Haye
Chas. Dennis

Inventor
Saml Gibson

N. PETERS, PHOTO-LITHOGRAPHER, WASHINGTON, D.C.

UNITED STATES PATENT OFFICE.

B. F. KOLLER, OF SHREWSBURY, PA., ASSIGNEE OF SAMUEL GIBSON.

IMPROVED SCRUBBING-BRUSH.

Specification forming part of Letters Patent No. 82,705, dated October 6, 1868; Reissue No. 3,773, dated December 21, 1869.

*To all whom it may concern:*

Be it known that SAMUEL GIBSON, of Safe Harbor, in the county of Lancaster and State of Pennsylvania, did invent certain new and useful Improvements in Scrubbing-Brushes; and I do hereby declare that the following is a full, clear, and exact description thereof, reference being had to the accompanying drawings, and to the letters of reference marked thereon.

The nature of this invention consists in the construction of a scrubbing-brush, in which the ordinary bristle-brush is combined with strips of rubber, and all are fastened together by means of a keeper, as will hereinafter be more fully described.

In order to enable others skilled in the art to which this invention appertains to make and use the same, I will now proceed to describe its construction and operation, referring to the annexed drawings, which form a part of this specification, and in which—

Figure 1:
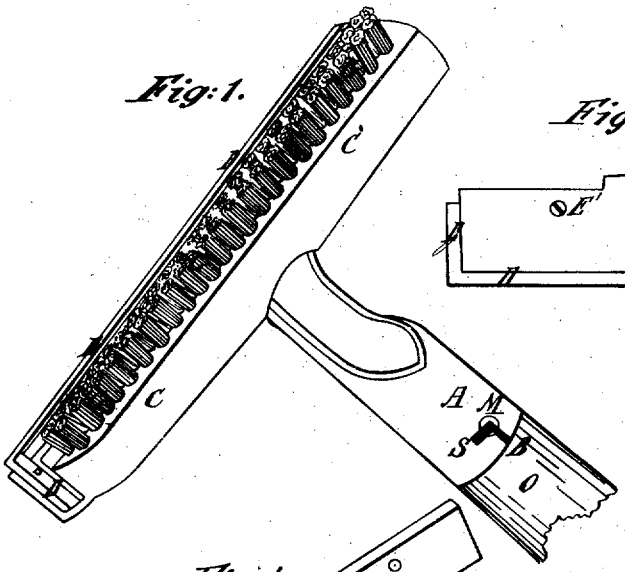
Figure 2:
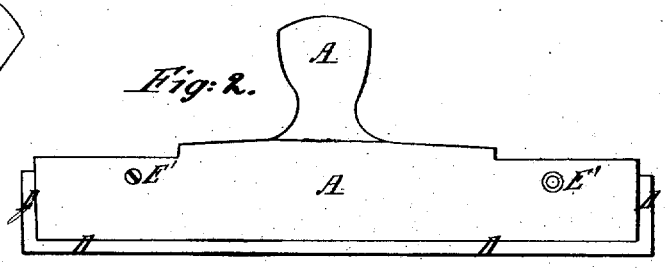
Figure 3:
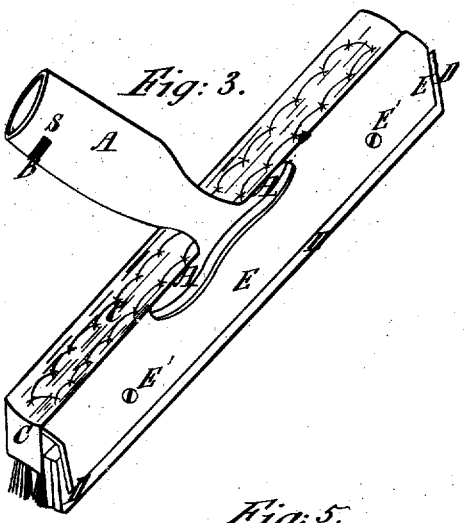
Figure 4:
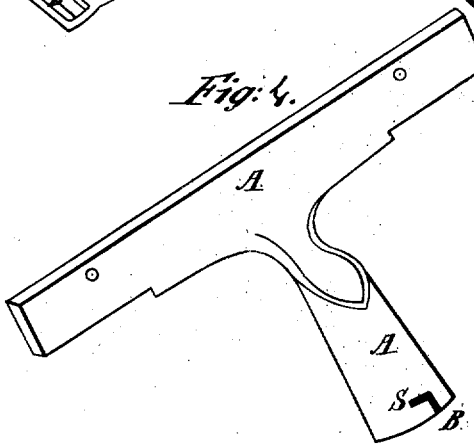
Figure 5:
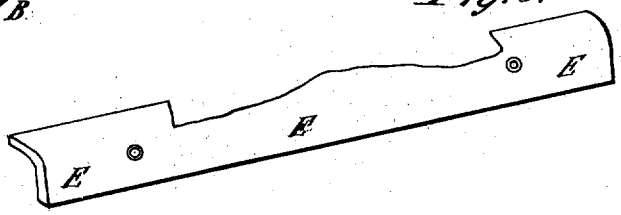

Figure 1 is a perspective view; Fig. 2, a longitudinal view; Fig. 3, a plan view; Fig. 4, a bottom view of the holder; Fig. 5, a side view of the clamp or keeper, and Fig. 6 a side view of the bristle-brush.

A represents the holder, which consists of a bar of metal provided with a handle, bent in the usual mode for scrubbing-brushes, and forming a socket in which the wooden handle is inserted. Between this holder and the clamp or keeper E, one, two, or more strips of rubber, D D, are inserted and fastened by means of two ordinary screws, E′ E′, as shown in Fig. 2. Said screws, compressing the keeper E and holder A, retain the rubber strips in any position desired, whether high or low.

Figure 6:
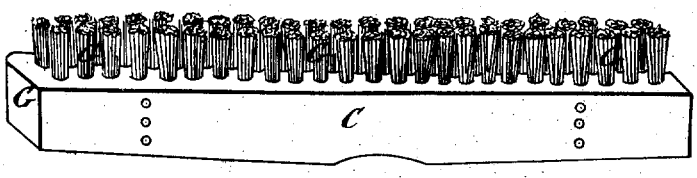

On the lower side of the holder, and by the same screws, is attached an ordinary-made scrubbing-brush, C, having one or more rows of bristles. Said brush, having two or more screw-holes, as shown in Fig. 6, can be raised or lowered at will, so that by raising the bristle part of the brush the rubbers D D will act independently as a drier.

On the upper side of the keeper E an ordinary brush, with two or more rows of bristles, may be attached by the same screws E′ E′ which hold the rubber and brush C together, which may be used as an ordinary scrubbing-brush.

The wooden handle O is attached by having near its end a common screw or pin, M, fitting in a slot, S, on the handle of holder A.

The operation of this improvement is as follows: The rubber and brush being fastened so that the bristles and rubbers are even, the bristles carry the water with them, the rubber acting as a drier. By taking out the handle, which by its simple fixing is done in a moment, the instrument can be used as a hand-brush.

Having thus described the invention of S. GIBSON, what I desire to secure by a reissue of his Letters Patent is—

1. Attaching a strip of rubber to one side of a long-handle scrubbing-brush so that it will be parallel with the rows of the bristles thereof, substantially as described.

2. In a long-handle scrubbing-brush, the arrangement of the strip of rubber D so as to project from one and the same side of the brush with the bristles thereof, substantially as and for the purpose specified.

3. The arrangement of the shouldered plate A and flanged keeper E, inclosing the strips of rubber D upon the forward part of the bristle brush G, all as herein shown and described.

B. F. KOLLER.

Witnesses:
JAMES H. GRIDLEY,
A. MOORE.